United States Patent [19]
Lebby et al.

[11] Patent Number: 5,345,524
[45] Date of Patent: Sep. 6, 1994

[54] OPTOELECTRONIC TRANSCEIVER SUB-MODULE AND METHOD FOR MAKING

[75] Inventors: Michael S. Lebby, Apache Junction; Christopher K. Y. Chun, Mesa; Shun-Meen Kuo, Chandler, all of Ariz.

[73] Assignee: Motorola, Inc., Schaumburg, Ill.

[21] Appl. No.: 63,826

[22] Filed: May 20, 1993

[51] Int. Cl.⁵ .............................................. G02B 6/36
[52] U.S. Cl. ...................................... 385/88; 385/89; 385/92
[58] Field of Search .............................. 385/88, 89, 92

[56] References Cited

U.S. PATENT DOCUMENTS

| | | | |
|---|---|---|---|
| 5,113,466 | 5/1992 | Acarlar et al. | 385/88 |
| 5,182,782 | 1/1993 | Tabasky et al. | 385/89 |
| 5,243,671 | 9/1993 | Koteles et al. | 385/31 |
| 5,249,245 | 9/1993 | Lebby et al. | 385/89 |

Primary Examiner—Frank Gonzalez
Attorney, Agent, or Firm—Gary W. Witting; Eugene A. Parsons

[57] ABSTRACT

A molded base (101) having a surface (102) and an edge surface (103) with an alignment ferrule (107, 108). A plurality of electrical tracings (110) are disposed on the surface (102) of the molded base (101). A plurality of core regions (120) are formed from an organic optical media having a first end (143) and a second end (144) positioned on the surface (102) of the molded base (101). The first end (143) of the core region (122, 121) begin at the edge (103) of the molded base (101) with the second end (144) extending onto the surface (102) of the molded base (101). A photonic device (130, 131, 430) is mounted onto the surface (102) of the molded base (101) with the second end (144) of the core region (122, 121,) operably coupled to the photonic device (130, 131, and 430) and electrically coupled to one of the plurality of electrical tracings (110).

11 Claims, 3 Drawing Sheets

OPTOELECTRONIC TRANSCEIVER SUB-MODULE AND METHOD FOR MAKING

BACKGROUND OF THE INVENTION

This invention relates, in general, to optoelectronic devices and, more particularly, to fabrication of optoelectronic transceiver sub-modules.

This application is related to U.S. Pat. No. 5,265,184, titled MOLDED WAVEGUIDE AND METHOD OF MAKING SAME, issued Nov. 28, 1993, and to U.S. Pat. No. 5,116,461, titled METHOD FOR FABRICATING AN ANGLE DIFFRACTION GRADING, issued May 26, 1992, which is hereby incorporated by reference herein.

In the past, several methods have been used to couple or interconnect an optical cable having a plurality of optical fibers to an optical interface device. These previous methods typically use a precision connector that retains the plurality of optical fibers firmly in place. Generally, the plurality of optical fibers extends out from the connector, thus exposing a cross-section of the plurality of optical fibers. The optical interface device typically is made with V-grooves that are chemically etched into the optical interface device, thereby allowing the plurality of optical fibers in the optical cable to be aligned, that is, placed and joined with the grooves of the optical interface device. However, since the V-grooves need to be precisely placed or positioned on the interface device, and since the V-grooves have to be precisely etched to a correct depth on the interface device, the V-grooves of the interface device are extremely difficult to manufacture, thus manufacturing of the optical interface device is achieved with a high cost.

Further, since it is important to have the plurality of optical fibers precisely aligned to a working portion of the optical interface device, the fabrication of the V-grooves or channels must be formed with very precise tolerances, thereby adding to the high cost of manufacture of the optical interface device. Additionally, since placement of individual fibers of the plurality of optical fibers to the optical interface device is achieved one optical fiber at a time, mass production of both the optical interface device and the connector is not possible using this method of manufacture, thus not allowing high volume manufacturing of either optical interface device or the connector. Moreover, in the past, use of the V-grooves as part of interface device severely limits design of optical interface devices, thus limiting flexibility, increasing cost, and not allowing mass production of the optical interface devices.

It can be readily seen that past methods for manufacturing of optical interface devices have severe limitations. It is also evident that past methods for fabricating or manufacturing the optical interface device are complex requiring high precision, high expense, as well as being difficult to manufacture. Accordingly, it is desirable to have a method and an article for manufacturing an optical interconnect device or an optoelectronic transceiver module, that has a low cost, and is easily manufactured.

SUMMARY OF THE INVENTION

Briefly stated, an article and method for making an optoelectronic sub-module are provided. A molded base having a surface and an edge surface with an alignment ferrule is formed. A plurality of electrical tracings is disposed on the surface of the molded base. A core region formed from an organic optical media having a first and a second end is positioned on the surface of the molded base. The first end of the core region that begins where the edge surface and the surface of the molded base meet and the second end of the core region extending onto the surface of the molded base. A photonic device having a working portion and an electrical contact is mounted onto the surface of the molded base with the second end of the core region operably coupled to the working portion of the photonic device and the contact of the photonic device electrically coupled to one of the plurality of electrical tracings.

DETAILED DESCRIPTION OF THE DRAWINGS

Figure 1:
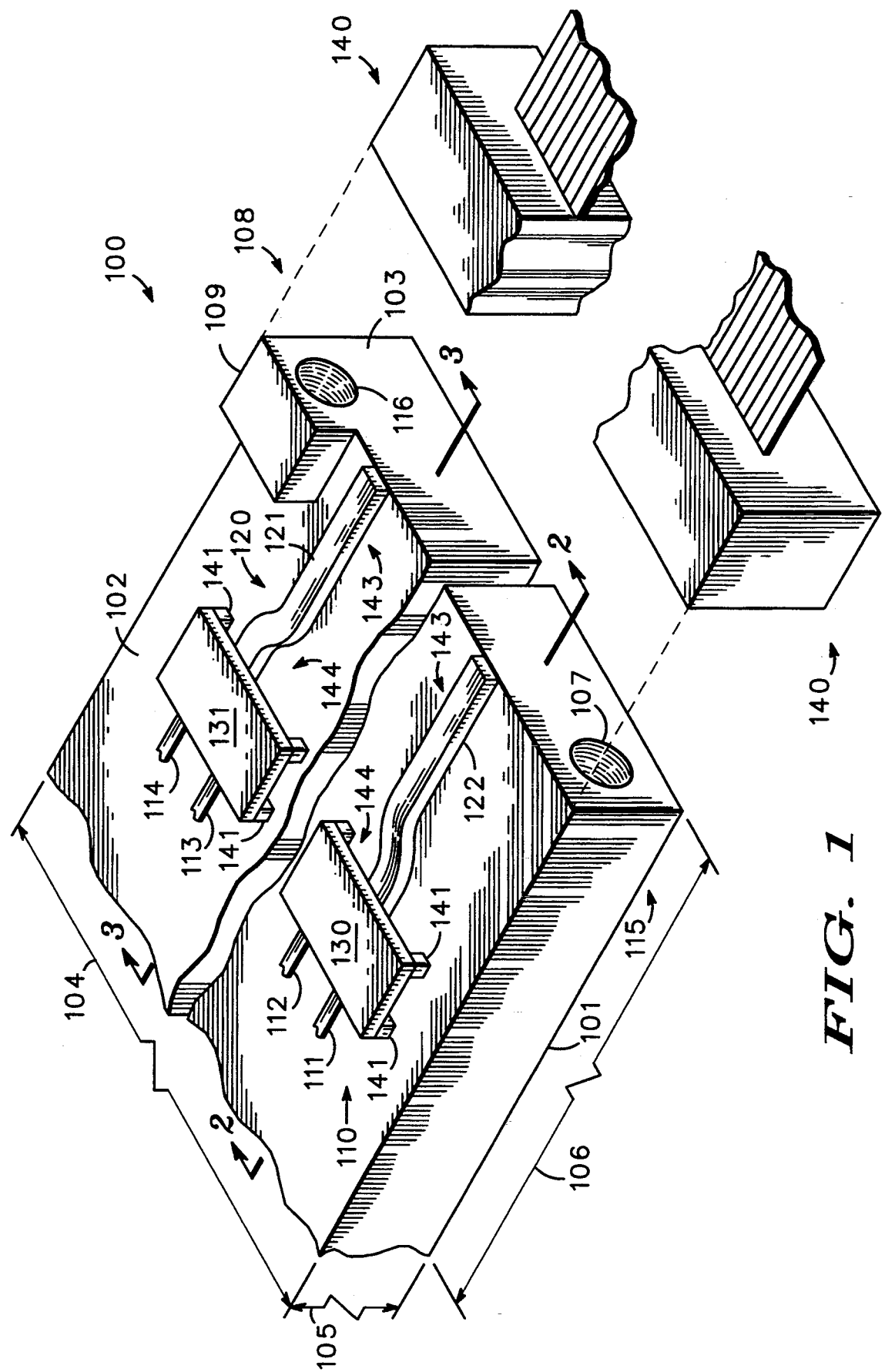
FIG. 1 is an enlarged simplified perspective view of an embodiment of an optoelectronic transceiver sub-module.

FIG. 1 illustrates an enlarged simplified perspective view of an embodiment of an optoelectronic transceiver sub-module 100. It should be understood that sub-module 100 has been greatly simplified and that many specific engineering details have been omitted so as to more clearly define and particularly point out the present invention. In the present invention, a novel combination of elements and processes is used to make sub-module 100.

Generally, sub-module 100 includes a molded base 101, a plurality of electrical tracings 110, a plurality of core regions 120, and photonic devices 130 and 131. Typically, molded base 101 is made in accordance with the teachings of U.S. Pat. No. 5,265,184, titled MOLDED WAVEGUIDE AND METHOD OF MAKING SAME.

Briefly, molded base 101 is made of any suitable hard optically active polymer material, such as plastics, polyimides, epoxies, or the like. The optically active polymer has a refractive index ranging from 1.4 to 1.7. Further, it should be understood that fillers such as silicates and silicones are capable of being added to the optically active polymer to improve structural characteristics, such as strength, resistance to temperature cycles, and the like.

Molded base 101 is capable of being manufactured to any suitable size, thereby providing sufficient room on surface 102 for the plurality of electrical tracings 110, a plurality of core regions 120, and devices 130 and 131. It should be understood that specific width 104, height 105, and length 106 is application specific, thus allowing changes to width 104, height 105, and length 106 to be made to each specific application and use of optoelectronic transceiver sub-module 100.

Edge surface 103 typically is a flat or facet surface that incorporates an alignment system, represented by alignment ferrules 107 and 108, for aligning an optical connector 140 to sub-module 100. Alignment ferrule 107 is made such that alignment ferrule 107 is totally incorporated into edge surface 103. As illustrated in FIG. 1, alignment ferrule 107 is located approximately mid-point between surface 102 and a minor surface or surface 115. However, it should be understood that placement of alignment ferrule 107 can be adjusted anywhere between surface 102 and surface 115.

Alignment ferrule 108 illustrates an alternative method for making same. In this specific example, alignment ferrule 108 is made from two portions 109 and 116. Portion 116 is an integral part of molded base 101 and is molded simultaneously with molded base 101. The portion 109 is molded separately. Portion 109 and portion 116 subsequently are joined to form alignment ferrule 108. Selection of either alternative alignment systems, allows for additional flexibility of placement or location of the alignment system that is used in conjunction with molded base 101.

Stand-offs 141 provide support for photonic devices 130 and 131. Generally, stand offs 141 are capable of being made by a variety of suitable methods, such as molding, milling, or the like. For example, stand-offs 141 are milled or molded separately and attached to molded base 101. However, in a preferred embodiment of the present invention, stand-offs 141 are molded simultaneously with molded base 101, thereby ensuring proper positioning and height of stand-offs 141.

The plurality of electrical tracings 110 is made by several well-known processes in the semiconductor art. Typically, a conductive material or alloy, such as aluminum or copper is deposited on surface 102 of molded base 101. Well-known photolithography and etch processes are used to define electrical tracings 111, 112, 113, and 114 on surface 102. Briefly, a photo-active polymer is applied to the conductive material. A pattern that defines electrical tracings 111, 112, 113, 114 is generated by exposing the photo-active polymer to light by any number of methods such a photo-projection, direct-write, or the like. Once the photo-active polymer has been exposed, the pattern is developed, thereby leaving portions of the conductive material masked by islands of polymer and other areas that are not masked exposed. A subsequent etching process is used to transfer the pattern that defines the plurality of electrical tracings 110 into the conductive material by etching the exposed areas of the conductive layer. Removal of the remaining photo-active polymer after etching typically is achieved by several well-known methods in the art, such as wet solvent treatments, dry plasma treatments, or the like.

The plurality of core regions 120 is made by several well-known processes in the semiconductor art. Typically, a layer of organic optical media is applied to surface 102 by any suitable method, such as spray coating, spin coating, or the like. The organic optical media is subsequently patterned to define core regions 121 and 122. The organic media typically has a refractive index ranging from 1.4 to 1.7; however, it should be understood that the refractive index of the optical media that eventually forms the plurality of core regions 120 is at least 0.01 greater than the refractive index of the molded base 101. Generally, the plurality of core regions 120 begin where surface 102 and edge surface 103 meet, thus allowing optical fibers (not shown) of optical connector 140 to be operably coupled to the plurality of core regions 120. Further, it should be understood that the plurality of core regions 120 extend across surface 102 to photonic devices 130 and 131.

In a preferred embodiment of the present invention, the optical media is made of a photosensitive organic polymer, such as photoresist, polyimide, polymethyl methacrylate (PMMA), or the like. The organic media is subsequently defined into core regions 121 and 122 having first ends 143 and second ends 144 by well-known photolithography and etching processes. For example, a photo-active organic media, such as PMMA, photoresist, or polyimide is applied to surface 102. A pattern that defines the plurality of core region 120 is generated by exposing the photo-active organic media to a light pattern (not shown) by any suitable method, such as photo-projection, direct-write, or the like. Once the PMMA has been exposed, the pattern is developed, thereby leaving portions of photo-active organic media on surface 102, thus generating the plurality of core regions 120.

Photonic devices 130 and 131 generally are either a photo-transmitter or a photo-receiver. Generally, photonic devices 130 and 131 are connected or coupled to the plurality of electrical tracings 110 by any suitable method well known in the art, such as wire bonding, tab bonding, bump bonding, or the like. In a preferred embodiment of the present invention, bump bonding is used to electrically and mechanically couple photonic devices 130 and 131 to the plurality of electrical tracings 110, as well as mechanically securing photonic devices 130 and 131 to surface 102 of molded base 101. Additionally, in a preferred embodiment of the present invention, when either photonic devices 130 and 131 are photo-transmitters, a vertical cavity surface emitting laser (VCSEL) is used. Further, when either photonic devices 130 and 131 are photo-receivers, a p-i-n photodiode or p-i-n detector is used.

Figure 2:
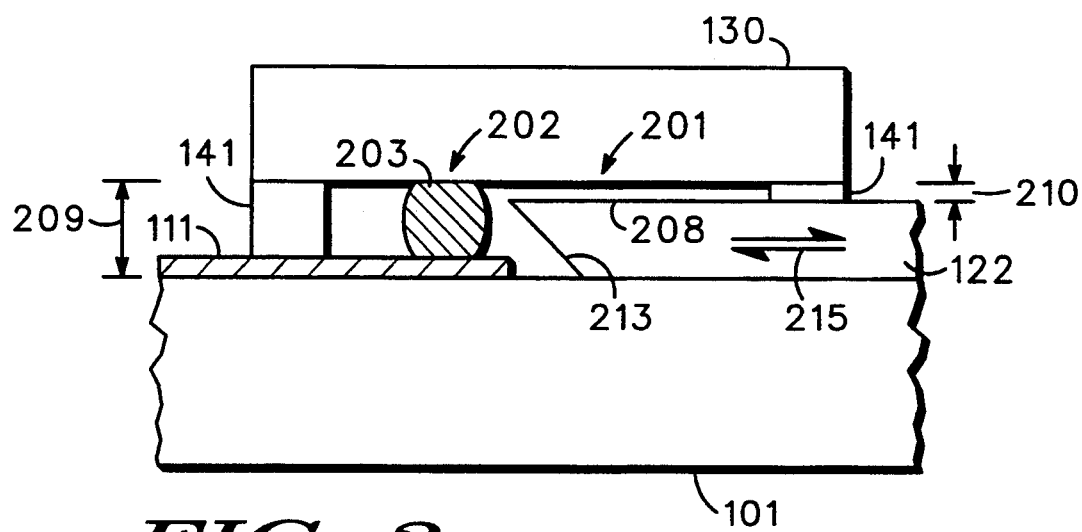
FIG. 2 is a greatly enlarged simplified partial cross-sectional view of the optoelectronic transceiver sub-module of FIG. 1 taken through 2—2.

FIG. 2 is a greatly enlarged simplified partial cross-sectional view of a portion of optoelectronic transceiver sub-module 100 of FIG. 1 taken through 2—2. It should be understood that similar structures identified in FIG. 1 will retain their original identification numerals.

As shown in FIG. 2, several features that were hidden from view in FIG. 1 are now capable of being visualized in cross-sectional form.

Photonic device 130 having a working portion 201 and an electrical contact portion 202 is position over core region 122 and electrical tracings 111 so as to operably couple working portion 201 to core region 122, as well as to electrically and mechanically couple contact portion 202 to electrical tracing 111.

Generally, electrical coupling of photonic device 130 to electrical tracing 111 is capable of being achieved by several well-known methods in the art, such as tab bonding, bump bonding, wire bonding, and the like; however, in a preferred embodiment of the present invention, bump bonding is used to electrically couple photonic device 130 to electrical tracing 111. As illustrated in FIG. 2, bump bond 203 electrically couples contact portion 202 to electrical tracings 111, as well as providing mechanical interconnection between photonic device 130 and electrical tracing 111, thereby providing electromechanical support in a single process step. Bump 203 is capable of being made from a variety of materials, such as solder, electrically conductive epoxies, gold, or the like. In a preferred embodiment of the present invention, conductive epoxy is used so as to provide a good electrical and mechanical contact between electrical tracing 111 and contact portion 202.

Additionally, by selecting a desired height 209 for stand-offs 141, a height or distance 210 is capable of being adjusted between working portion 201 of photonic device 130 and surface 208 of core region 112, thereby enhancing coupling interaction between working portion 201 and core region 122. Further, it should be understood that stand-offs 141 are capable of being made in such a manner so as to provide both electrical conduction and thermal conduction, thus enabling stand-offs 141 to be utilized for a variety of functions, such as electrical interconnection, thermal relief, and mechanical support.

Surface 213 of core region 122 is made in accordance with the teachings of U.S. Pat. No. 5,116,461, by Lebby et al, "METHOD FOR FABRICATING AN ANGLED DIFFRACTION GRATING", and having the same assignee. Briefly, once the optical media has been applied to surface 102 of molded base 101, a subsequent photoactive material (not shown) such as photoresist is applied to the optical media. The photoresist that has been subsequently applied is exposed and developed on the optical media, thereby generating a pattern on the optical media. This pattern on the optical media is then used to transfer the pattern into the optical media layer. Surface 213 is etched or formed by placing the patterned optical media in a tilted position while a plasma reactor injects ions onto the optical media. A directional beam, such as an argon beam travels through the injected ions and strikes the patterned optical media at an angle, thereby transferring both a physical component and a chemical component to the patterned optical media, thus generating angled surface 213.

Since photonic device 130 is capable of either being a photo-transmitter or a photo-receiver, arrows 215 illustrate a light signal traveling through core region 122 in either direction. With photonic device 130 being a photo-receiver light signal 215 is reflected off of surface 213 and toward working portion 201, thus operably coupling core region 122 to working portion 201 of photonic device 130. Alternatively, with photonic device 130 being a photo-transmitter light signal 215 originated from working portion 201 is reflected off of surface 213 and directed out and away from photonic device 130. It should be understood that once light signal 215 is in core region 122, light signal 215 will continue to waveguide or travel through core region 122.

Figure 3:
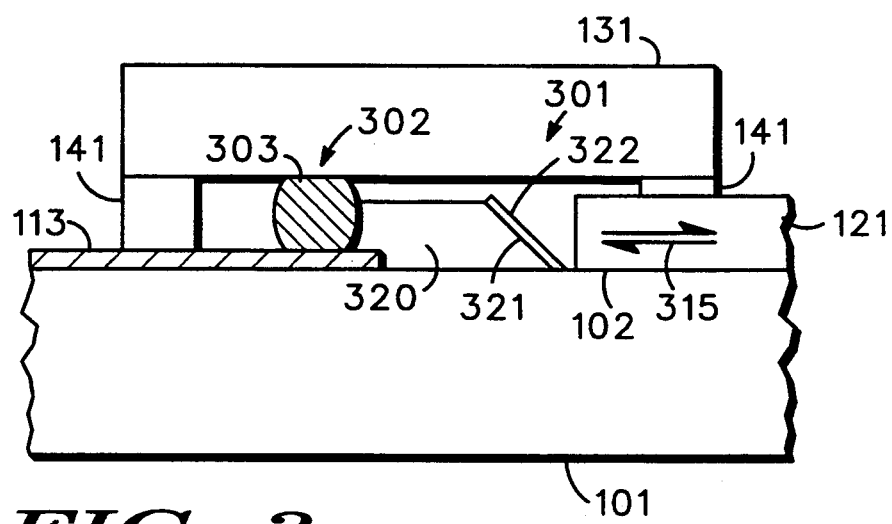
FIG. 3 is a greatly enlarged simplified partial cross-sectional view of the optoelectronic transceiver sub-module of FIG. 1 taken through 3—3.

FIG. 3 is a greatly enlarged simplified partial cross-sectional view of the optoelectronic transceiver sub-module of FIG. 1 taken through 3—3. It should be understood that similar features discussed previously in FIG. 2 have the same numerical identity except that the numerical 3 has replaced the numeral 2 while features described in FIG. 1 have retained there identical numerals.

Referring now to FIG. 3, FIG. 3 illustrates an alternative method to operably couple light signal 315 to working portion 103 of photonic device 131. In this alternative method, a form 320 having surface 321 is positioned in such a manner that light signal 315 exiting core region 122 is reflected off of surface 321 into working portion 301.

Generally, form 320 is capable of being made by any suitable method, such as molding, milling, or the like. However in a preferred embodiment of the present invention, form 320 is molded simultaneously with molded base 101, thereby providing an accurate and precise placement of surface 321 with respect to the alignment system, core region 121, and working portion 301 of photonic device 131. Further, it should be understood that accurate and precise placement of photonic device 131 is achieved by using an automated system (not shown) that automatically places photonic device 131 by using machine vision. Generally, the automated system that is used for placement of photonic devices 130 and 131 typically is accurate to ±2.0 microns. However, it should be understood that accuracy of the automated system will improve as time goes by. Typically, fiducials (not shown) are molded simultaneously with molded base 101 and used to align photonic device 131. In addition, if form 320 is made separately, the fiducials molded into molded base 101 are used to precisely and accurately place form 320 in position.

Additionally, it should be understood that surface 321 of form 320 is capable of being coated with a layer 322 so as to improve reflectivity of light signal 315. Generally, coating 322 is made from any number of reflective materials such as aluminum, gold, silver, or the like. Generally, these reflective materials are deposited onto surface 321 by any suitable well-known method in the art, such as sputtering, evaporation, or the like.

Generally, light signal 315 is operably coupled to working portion 301 of photonic device 131 in a similar manner as previously described in FIG. 2; however, in this particular illustration, light signal 315 is reflected off of either surface 322 or surface 321 into working portion 301 of photonic device 131. It should be understood that when photonic device 131 is a photo-transmitter that light emitting from working portion 301 is reflected from reflective layer 322 or surface 321 into core region 122, thereby generating light signal 315 in core region 122.

Figure 4:
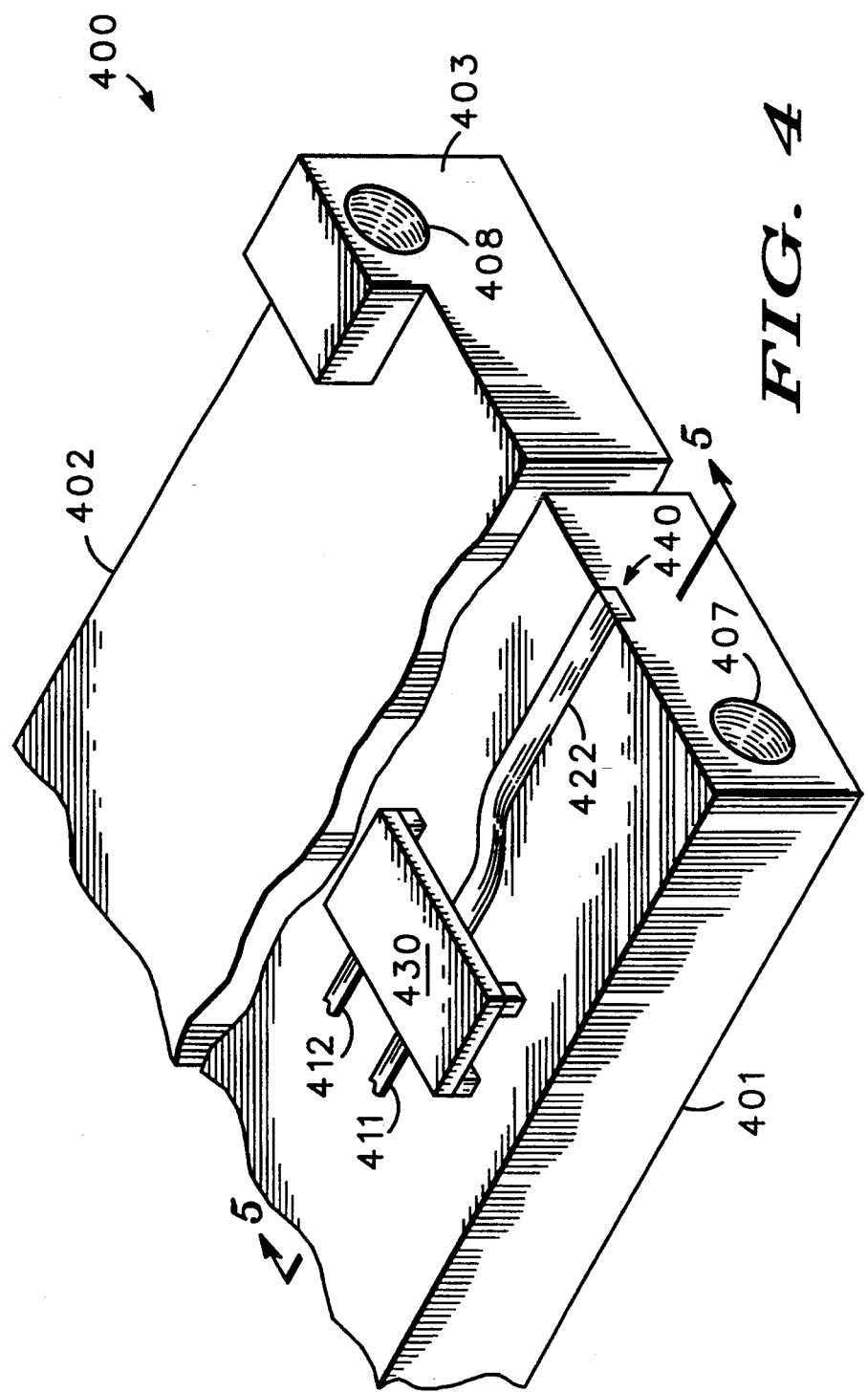
FIG. 4 is an enlarged simplified perspective view of another embodiment of an optoelectronic transceiver sub-module.

FIG. 4 is an enlarged simplified perspective view of another embodiment of an optoelectronic transceiver sub-module 400. It should be understood that similar features discussed previously in FIG. 1 have the same numerical identity except that a numeral 4 has replaced the numeral 1. In this particular embodiment of the present invention, groove or channel 440 is formed in molded base 401. Generally, groove or channel 440 begins at edge 403 and extends into surface 402 to an approximate location where photonic device 430 is mounted to surface 402.

Generally, groove 440 is capable of being made by any suitable method, such as machining, milling, molding, or the like. However, in a preferred embodiment of the present invention, groove 440 is molded simultaneously with molded base 401 thereby achieving accurate and precise placement of groove 440 in relationship to alignment ferrules 407 and 408. Once groove 440 has been formed, groove 440 is filled with an optical media material having a refractive index of at least 0.01 greater than the refractive index of molded base 401, thereby generating a waveguide having core region 422 and a cladding region being molded base 401.

Typically, filling of groove 440 with optical media is achieved by applying an organic optical media to surface 402 of molded base 401. Generally, excess organic optical media that has been applied to surface 402 of molded base 401 is removed by any suitable method, such as mechanically planarizing, chemically planarizing, or the like.

Generally, in a preferred embodiment of the present invention, excess organic optical media is removed by chemically planarizing the excess optical media away from surface 402, thereby leaving the organic optical media in channel 440, thus generating core region 422. For example, chemical planarizing is by etching or chemically removing excess organic optical media by an oxygen based plasma chemistry. Generally, once the organic optical media has been applied to surface 402 of molded base 401, molded base 401 is placed into a plasma reactor (not shown) and subjected to an oxygen plasma that etches or removes the organic optical media, thus removing the organic optical media from 402 until only a portion of the organic optical media is left in channel 440.

Figure 5:
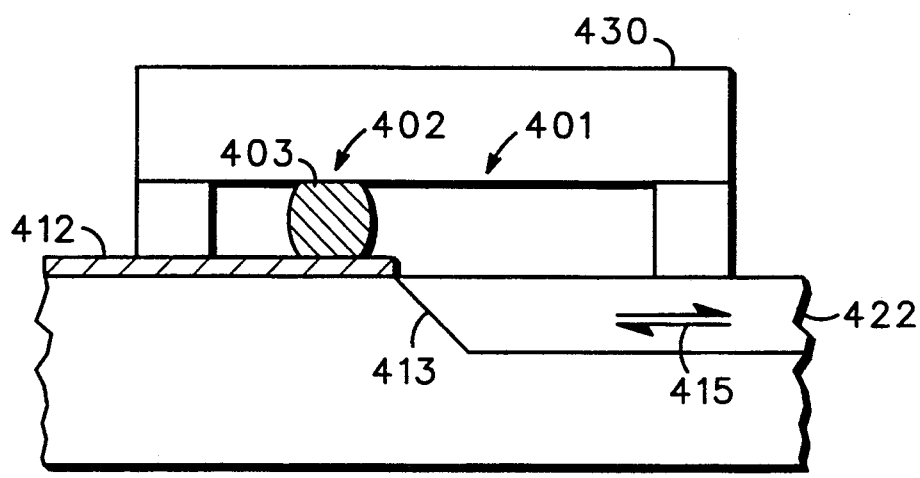
FIG. 5 is a greatly enlarged simplified partial cross-sectional view of the optoelectronic transceiver sub-module of FIG. 4 taken through 4—4.

FIG. 5 is a greatly enlarged simplified partial cross-sectional view of a portion of optoelectronic transceiver module 400 of FIG. 4 taken through 4—4. It should be understood that similar features discussed previously in FIG. 4 will retain their original identification numerals.

As shown in FIG. 5 several features that were hidden from view in FIG. 4 are now capable of being visualized in cross-sectional form.

Photonic device 430 having a working portion 401 and an electrical contact portion 402 is positioned over core region 422 and electrical tracing 412 so as to operably couple working portion 401 to core region 422, as well as operably couple contact portion 402 to electrical tracing 412.

Generally, electrical coupling of photonic device 430 to electrical tracings 412 through bumps 403 has been previously described in FIG. 2, wherein photonic device 130 is electrically coupled to electrical tracing 111 through bump 203.

Operably coupling working portion 401 of photonic device 430 is achieved by angled surface 413. Since photonic device 430 is capable of being either a photo-transmitter or a photo-receiver, arrows 415 illustrate a light signal traveling through core region 422. With photonic device 430 being a photo-receiver light signal 415 is reflected off surface 413 and towards working portion 401, thus operably coupling core region 422 to working portion 401 of photonic device 430. Alternatively, with photonic device 430 being a photo-transmitter, light signal 415 that originated from working portion 401 is reflected off surface 413 through core region 422 and away from photonic device 430.

Generally angled surface 413 is capable of being molded at any desired angle. However, in a preferred embodiment of the present invention, angled surface 413 is molded between a range of 60 degrees to 30 degrees from nominal. Preferably, angled surface 413 is molded at 45 degrees from nominal, thereby providing reflection into or out of working portion 401 of photonic device 430.

By now it should be clear that a novel optoelectronic transceiver module has been provided by this invention that combines the advantages of fewer processing steps and fewer parts during its fabrication and overall assembly. Moreover the optoelectronic transceiver sub-module also provides an advantage of accurate and precise passive alignment of an optical cable to core regions of optoelectronic transceiver sub-module.

What is claimed is:

1. An optoelectronic transceiver module comprising:
a molded base with a refractive index ranging from 1.4 to 1.7 having a first surface and an edge surface with an alignment ferrule positioned in the edge surface;
a plurality of electrical tracings disposed on the first surface on the molded base;
a core region with a refractive index ranging from 1.4 to 1.7 formed from an organic optical media having a first end and a second end, wherein the refractive index of the core region is at least 0.1 greater than that of the molded base, the core region positioned on the first surface of the molded base, the first end of the core region beginning at the edge surface of the molded base and the core region extending on the first surface of the molded base; and
a photonic device mounted on the surface of the molded base with the second end of the core region operably coupled to the photonic device, and the photonic device electrically coupled to one of the plurality of electrical tracings.

2. The optoelectronic transceiver module as claimed in claim 1 wherein the photonic device is an photo-receiver.

3. The optoelectronic transceiver module as claimed in claim 1 wherein the photonic device is an photo-transmitter.

4. An optoelectronic transceiver module comprising:
a molded base with a refractive index ranging from 1.4 to 1.7 having a first surface and an edge surface with an alignment ferrule positioned in the edge surface of the molded base, the first surface having stand-offs that generate an elevated second surface;
a plurality of electrical tracings disposed on the surface the molded base;
a core region with a refractive index ranging from 1.4 to 1.7 formed from an organic optical media having a first end and a second end, wherein the refractive index of the core region is at least 0.1 greater than that of the molded base, the core region positioned on the surface of the base, the first end of the core region beginning at the edge surface of the base and extending onto the first surface of the base; and
a photonic device having a working portion and an electrical contact mounted on the elevated second surface of the stand-offs on the base with the second end of the organic waveguide operably coupled to the working portion of the photonic device and with the electrical contact of the photonic device electrically coupled to one of the plurality of electrical tracings, thereby generating an optoelectronic transceiver module.

5. The optoelectronic transceiver module as claimed in claim 4 wherein the stand-offs are molded simultaneously with the molded base.

6. The optoelectronic transceiver module as claimed in claim 4 wherein the stand-offs is thermally conductive.

7. The optoelectronic transceiver module as claimed in claim 5 further comprising the second end of the organic waveguide terminating in a angled reflective surface to reflect light into the working portion of the photonic device.

8. The optoelectronic transceiver module as claimed in claim 7 wherein in the angled reflective surface is positioned at angle ranging from 30 degrees to 60 degrees.

9. A method for making an optoelectronic transceiver module comprising the steps of:
molding a base having a first surface and an edge surface with an alignment ferrule that is positioned on the edge surface;
disposing a plurality of electrical tracings on the first surface of the base;

applying a photo-active optical media on the first surface of the base;

exposing the photo-active optical media on the first surface to form an area of higher refractive index than the base and an area of lower refractive index; and developing the photo-active optical media which washes away the area of lower refractive index of the photo-active optical media and retaining the area of higher refractive index to form a core region having a first end and a second end, wherein the first end of the core region begins at the edge surface on the first surface and the second end of the core region extends onto the first surface of the base; and mounting a photonic device having a working portion and an electrical contact on the first surface of the base with the second end of the core region operably coupled to the working portion of the photonic device, and the contact of the photonic device electrically coupled one of the plurality of electrical tracings.

10. A method for making an optoelectronic transceiver module comprises the steps of:

molding a base having a first surface and an edge surface with an alignment ferrule that is positioned on the edge surface;

disposing a plurality of electrical tracings on the first surface of the base;

applying a organic optical media having a refractive index ranging from 1.4 to 1.7 on the first surface of the base;

forming a patterned masking layer having a first end and a second end on the organic optical media, thereby exposing portions of the organic optical media and covering other portions the organic optical media; and etching the organic optical media at an angle to transfer the patterned masking layer into the organic optical media and forming an angled surface in the organic optical media at the second end of the patterned masking layer; and mounting a photonic device having a working portion and an electrical contact on the surface of the base with the second end of the core region operably coupled to the working portion of the photonic device, and the contact of the photonic device electrically coupled one of the plurality of electrical tracings.

11. An optoelectronic transceiver module comprising:

a molded base having a first surface, an edge surface with an alignment ferrule positioned in the edge surface of the molded base, a channel having a first end and a second end with the first end of the channel beginning at the edge surface and the second end extending into the first surface of the molded base, and stand-offs on the first surface that generate an elevated second surface;

a plurality of electrical tracings disposed on the surface the molded base;

a core region formed in the channel of the molded base from an organic optical media having a first end and a second end, the core region positioned on the surface of the base, the first end of the core region beginning the edge of the base and extending on the first surface of the base; and a photonic device having a working portion and an electrical contact mounted on the elevated second surface of the stand-offs on the base with the second end of the organic waveguide operably coupled to the photonic device and with the electrical contact of the photonic device electrically coupled to one of the plurality of electrical tracings, thereby generating an optoelectronic transceiver module.

* * * * *